Figure 1:
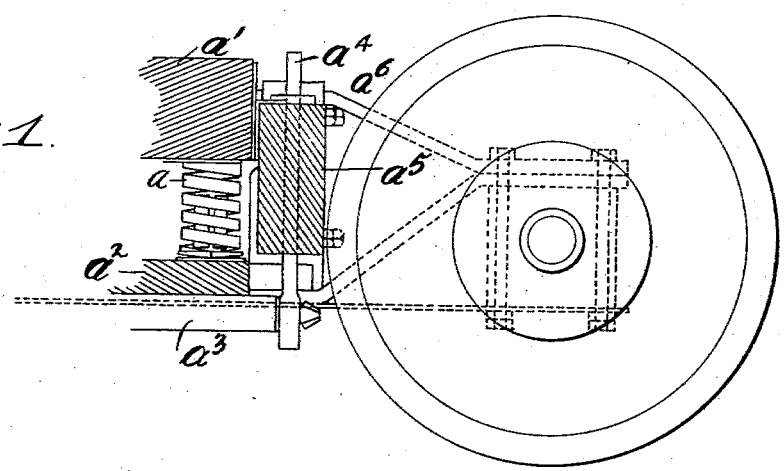

No. 629,110. Patented July 18, 1899.
A. C. McCORD.
SPRING CUSHION.
(Application filed Apr. 3, 1899.)
(No Model.)

Witnesses:
Chas. E. Hubert
A. D. Lawrence

Inventor:
Alvin C. McCord
By Charles A. Brown & Cragg
Attorneys.

UNITED STATES PATENT OFFICE.

ALVIN C. McCORD, OF CHICAGO, ILLINOIS.

SPRING-CUSHION.

SPECIFICATION forming part of Letters Patent No. 629,110, dated July 18, 1899.

Application filed April 3, 1899. Serial No. 711,486. (No model.)

*To all whom it may concern:*

Be it known that I, ALVIN C. McCORD, a citizen of the United States, residing at Chicago, in the county of Cook and State of Illinois, have invented a certain new and useful Improvement in Spring-Cushions, (Case No. 5,) of which the following is a full, clear, concise, and exact description, reference being had to the accompanying drawings, forming a part of this specification.

My invention relates to spring-cushions, and more particularly to that class of spring-cushions employing friction devices to decrease the vibratory movements thereof.

My invention has for its objects to increase the effectiveness of devices of this class known or used prior to my invention and also to simplify the construction thereof.

Generally speaking, my invention comprises a spring to be interposed between the parts to be cushioned and a friction device added to said spring which is frictionally engaged or adapted to be frictionally engaged by the spring and which is operated thereby in the preferred construction.

My invention in its preferred embodiment comprises a coiled spring for interposition between the parts to be cushioned and a friction-lever device or element operated thereby and engaging or adapted to engage the spring to create the desired friction. By this construction a special friction element for engaging the friction device is dispensed with, a portion of the spring acting as a friction element with which the friction device is adapted to engage. The particular friction device that I prefer to employ consists of lever mechanism operated by the spring, whereby friction varying with the load may be produced.

The device of my present invention is primarily adapted for use in the construction of railway-vehicles, the device being of particular utility in the construction of car trucks and buffers, although it is not limited to this use.

In the construction of car-trucks bolsters have been supported either upon coiled springs or upon elliptic springs. The elliptic springs possess an advantage over the coiled springs when the latter are unaccompanied by auxiliary devices in that by their use each jolting movement of the car-truck will be accompanied by a single movement of the bolster, while with the coiled springs each jolting movement of the car-truck is accompanied by several movements of the bolster and the car-body mounted thereon. The elliptic springs, however, are much more expensive than the coiled springs and are of very much shorter life. By means of my invention I am enabled practically to secure the results obtained by the use of elliptic springs and am at the same time enabled to produce a spring-cushion which is cheaper and which will last longer than the elliptic springs heretofore used. In the construction of trucks for supporting passenger-coaches, locomotives, and freight-cars for conveying delicate and perishable freight it is necessary that the jolting movements of the bolster be minimized, for which purpose elliptic springs have most generally been employed. I find that I am enabled to replace elliptic springs used in these various connections by the simpler and cheaper device of my construction, securing practically the same results. In some of the claims, however, I have not limited myself to coiled springs, though in the preferred embodiment the coiled spring forms a very important element of the invention.

I will explain my invention more particularly by reference to the accompanying drawings and will particularly point out the same in the claims.

Figure 2:
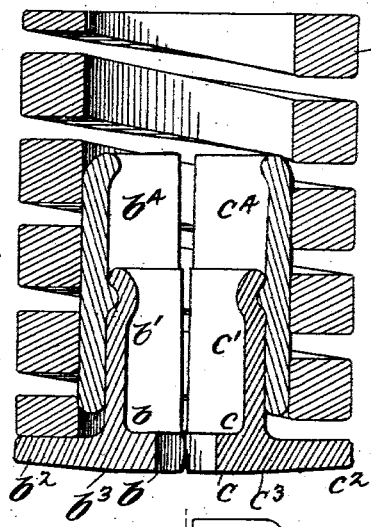
Figure 3:
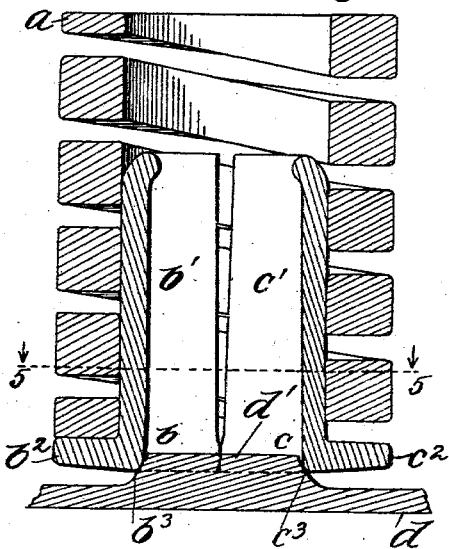
Figure 4:
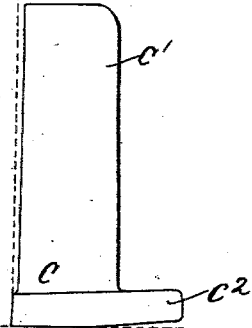
Figure 5:
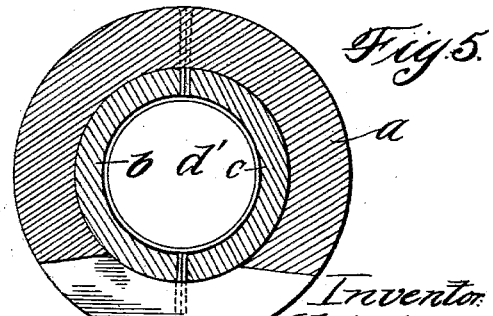

In the drawings, Figure 1 is a side view of a portion of a swing-motion truck with a device of my invention in place. Fig. 2 is a vertical sectional view of the spring-cushion shown in Fig. 1. Fig. 3 is a vertical sectional view of a modified form of spring-cushion constructed in accordance with my invention. Fig. 4 is a side elevation of a lever entering into the construction of the device shown in Fig. 3. Fig. 5 is a sectional plan view on line 5 5, Fig. 3.

Like letters indicate like parts throughout the different views.

In Fig. 1 I have illustrated my invention as applied to a well-known swing-motion diamond freight-car truck. The invention, however, is capable of use with other forms of car-trucks and for other purposes.

I have shown but one spring *a* of a group, which is interposed between the bolster $a'$ and spring-plank $a^2$. As the construction and arrangement of the spring-plank bearing $a^3$, column-bolt $a^4$, column guide or transom $a^5$, and the arch-bars $a^6$ are well known to those skilled in the art I do not deem further mention thereof to be essential.

The spring $a$ is preferably made of square bar-steel to afford a large frictional contact-surface for engagement with the frictional device or element operated thereby. The friction device that I employ consists, preferably, in a lever mechanism. In the structure shown in Fig. 2 the lever mechanism is in the form of two levers $b$ $c$, each in the form of a bell-crank lever. The arms $b'$ $c'$ of the levers extend within the bore of the spring, while the arms $b^2$ $c^2$ extend outwardly beneath the spring to receive the axial pressure of the spring. The arms $b^2$ $c^2$ are provided with fulcrum-points $b^3$ $c^3$, about which the levers swing or tend to swing or rotate.

I preferably provide means for maintaining uniform contact between the spring and the arms of the levers within the same. In the structure shown in Fig. 2 I make the arms of the levers within the spring each in two parts, the parts $b^4$ $c^4$ of said arms having pivotal or swinging connection with the remaining portions of the arms, whereby said parts $b^4$ $c^4$ may be maintained in engagement with the coiled spring throughout the length of said parts irrespective of the angular position of the arms $b^2$ $c^2$ and the parts $b'$ $c'$ rigidly connected therewith. The same result is accomplished by the structure shown in Figs. 3, 4, and 5, in which a lever-plate $d$ is employed, a truncated conical projection $d'$ being provided upon said plate, with the sloping sides of which projection the fulcrum-points of the levers engage. By reason of the engagement of the fulcrum-points with a downwardly-sloping base the engagement of the spring throughout the length of the upright arms is not only uniform, but the levers accommodate themselves to springs of slightly-different diameters and readjust themselves as the springs and the said arms are worn away.

As coiled springs are liable to transverse flexure, especially when employed in car-trucks, I curve the upper ends of the levers inwardly, so that the levers cannot prevent the compression of the spring, whereby breakage of the spring-cushion mechanism is prevented.

The arms of the levers extending within the spring are preferably semicircular in cross-section, as shown in Fig. 5, the levers when assembled forming a longitudinally-split tube, the arms $b^2$ $c^2$ forming a flange to the tube. Those portions of the arms $b^2$ $c^2$ that engage the spring $a$ are preferably inclined from the periphery toward the center, as shown in Fig. 4, so that the spring will only engage the arms at opposite portions of the periphery when the levers are unexpanded, so that upon the application of force to the springs the friction-levers may be rocked and brought into engagement with the spring. The levers are disposed in the application of the invention shown in Fig. 1 upon the spring-plank.

While I have illustrated the spring-cushion of my invention as being disposed between the bolster and spring-plank of a car-truck, it is obvious that it may be disposed between other parts whose relative movement is to be retarded or to reduce the number of vibrations.

It will be observed that the coiled spring $a$ performs the double function of cushioning the separated parts and of transmitting to the friction-levers any force impressed upon the coiled spring by the separated parts. Thus the coiled spring upon its compression is the means of securing frictional pressure between the elements of the friction device. The frictional pressure varies with the load or pressure upon the spring.

It will be apparent that no auxiliary devices need be employed in the preferred construction for securing frictional pressure between the elements of the friction device, the separated parts being adapted to furnish the necessary force, while in the preferred embodiment the coiled spring of the cushion is employed to transmit the force to frictionally engage the elements of the friction device.

When the device of my invention is employed in car-trucks, the coiled spring is constantly under pressure, whereby the frictional elements are constantly maintained in engagement, the frictional pressure varying according to the degree of compression of the spring.

It is obvious that changes may be made in my improved spring-cushion without departing from the spirit of my invention, and I do not therefore desire to be limited to the precise construction shown; but,

Having thus described my invention, what I claim as new, and desire to secure by Letters Patent, is—

1. In a spring-cushion, the combination with a spring interposed between the parts to be cushioned, of a friction device added to and operated by the spring and brought thereby into frictional contact therewith, substantially as described.

2. In a spring-cushion, the combination with a coiled spring interposed between the parts to be cushioned, of a friction device added to and operated by the spring and brought thereby into frictional contact therewith, substantially as described.

3. In a spring-cushion, the combination with the coiled spring $a$, of a friction-lever mechanism engaging or adapted frictionally to engage the spring, the pressure of the spring acting upon the said friction-lever mechanism to cause frictional pressure, varying with the load, against the spring, substantially as described.

4. In a spring-cushion, the combination with the coiled spring $a$, of opposed bell-crank levers $b$ $c$, an arm of each of which extends within the spring, said arms engaging or adapted frictionally to engage the spring, the remaining arm of each lever engaging the spring to receive the axial pressure thereof, whereby frictional pressure varying with the load is exerted by the levers against the interior of the spring, substantially as described.

5. In a spring-cushion, the combination with the coiled spring $a$, of friction-levers engaging, or adapted frictionally to engage, and being operated by the spring, substantially as described.

6. In a spring-cushion, the combination with a spring interposed between the parts to be cushioned, of a friction-lever added to and operated by the spring and brought thereby into frictional contact therewith, substantially as described.

7. In a spring-cushion, the combination with a coiled spring interposed between the parts to be cushioned, of a friction-lever added to and operated by the spring and brought thereby into frictional contact therewith, substantially as described.

8. In a spring-cushion, the combination with the coiled spring $a$, of friction-levers extending within the spring, said friction-levers frictionally engaging, or adapted frictionally to engage, and being operated by the spring, substantially as described.

9. In a spring-cushion, the combination with a spring interposed between the parts to be cushioned, of a friction bell-crank lever added to and operated by the spring and brought thereby into frictional contact therewith, substantially as described.

10. In a spring-cushion, the combination with a coiled spring interposed between the parts to be cushioned, of a friction bell-crank lever added to and operated by the spring and brought thereby into frictional contact therewith, substantially as described.

11. In a spring-cushion, the combination with a coiled spring interposed between the parts to be cushioned, of a friction bell-crank lever having one arm extending within the spring and engaging or adapted frictionally to engage the interior of the spring, the remaining arm of the lever being engaged by and adapted to receive the axial pressure of the spring to operate the friction-lever, substantially as described.

12. In a spring-cushion, the combination with a coiled spring interposed between the parts to be cushioned, of a friction bell-crank lever having one arm extending within the spring and engaging or adapted frictionally to engage the interior of the spring, the remaining arm of the lever being engaged by and adapted to receive the axial pressure of the spring to operate the friction-lever, and means for maintaining the arm of the lever within the spring in uniform contact therewith, substantially as described.

13. In a spring-cushion, the combination with a coiled spring interposed between the parts to be cushioned, of a friction bell-crank lever having one arm extending within the spring and engaging or adapted frictionally to engage the interior of the spring, the remaining arm of the lever being engaged by and adapted to receive the axial pressure of the spring to operate the friction-lever, and a support provided with a sloping engaging surface with which the fulcrum of the lever engages, whereby the arm within the spring is maintained in uniform contact with the sleeve, substantially as described.

14. In a spring-cushion, the combination with a spring interposed between the parts to be cushioned, of a friction device added to said spring and having or adapted to have frictional contact therewith, substantially as described.

15. In a spring-cushion, the combination with a spring interposed between the parts to be cushioned, of a friction-lever added to said spring and having or adapted to have frictional contact therewith, substantially as described.

16. In a spring-cushion, the combination with a coiled spring interposed between the parts to be cushioned, of a friction device added to said spring and having or adapted to have frictional contact therewith, substantially as described.

17. In a spring-cushion, the combination with a coiled spring interposed between the parts to be cushioned, of a friction-lever added to said spring and having or adapted to have frictional contact therewith, substantially as described.

In witness whereof I hereunto subscribe my name this 28th day of March, A. D. 1899.

ALVIN C. McCORD.

Witnesses:
JUDSON G. LAMON,
GEORGE L. CRAGG.